(12) United States Patent
Guerra (10) Patent No.: US 6,743,401 B2
(45) Date of Patent: Jun. 1, 2004

(54) CLOSED CYCLONE SYSTEM HAVING A FLOW RATE DISTRIBUTOR AND USE OF SAME

(75) Inventor: Eduardo Cardoso De Melo Guerra, Petrópolis (BR)

(73) Assignee: Petroleo Brasileiro S.A., Rio de Janeiro (BR)

( * ) Notice: Subject to any disclaimer, the term of this patent is extended or adjusted under 35 U.S.C. 154(b) by 577 days.

(21) Appl. No.: 09/849,352

(22) Filed: May 7, 2001

(65) Prior Publication Data

US 2004/0071608 A1 Apr. 15, 2004

(30) Foreign Application Priority Data

May 9, 2000 (BR) .............................................. 0002087

(51) Int. Cl.⁷ ............................................... F27B 15/08
(52) U.S. Cl. ...................................... 422/147; 422/141
(58) Field of Search ................................. 422/147, 141, 422/168, 169; 55/430, 431, 478, 482

(56) References Cited

U.S. PATENT DOCUMENTS

| 4,502,947 | A | | 3/1985 | Haddad et al. ............. 208/161 |
|---|---|---|---|---|
| 4,623,446 | A | * | 11/1986 | Haddad et al. ............. 208/113 |
| 4,749,471 | A | * | 6/1988 | Kam et al. ................... 208/113 |
| 5,449,498 | A | * | 9/1995 | Cetinkaya ................... 422/144 |
| 5,569,435 | A | | 10/1996 | Fusco et al. ................. 422/147 |

* cited by examiner

Primary Examiner—M. Alexandra Elve
(74) Attorney, Agent, or Firm—Sughrue Mion, PLLC (57) ABSTRACT

A distributor (9) for the equalization of flow rate of cyclones in closed cyclone systems installed in the interconnection of the cyclones of the disengager vessel of the gas-solid suspension of the fluid catalytic cracking (FCC) processes is described, that distributes the gases exiting the first stage cyclones so as to promote a desirable and uniform flow rate of said gases through said space, besides absorbing the relative movements between the cyclones caused by the differential thermal expansion. The distributor of the invention secures a homogeneous accommodation of the gas-solid suspension in a connecting pipe, allowing a uniform cyclone operation in the next stage, no matter the geometry of the riser-cyclone set or of the downer-cyclone set.

15 Claims, 6 Drawing Sheets

INVENTION

FIG. 1 STATE-OF-THE-ART

FIG. 2  INVENTION

FIG. 3    INVENTION

"A-A"

"B-B"

FIG. 4  INVENTION

FIG. 5   INVENTION

"C-C"

FIG. 6  INVENTION

CLOSED CYCLONE SYSTEM HAVING A FLOW RATE DISTRIBUTOR AND USE OF SAME

FIELD OF THE INVENTION

The present invention relates to a closed cyclone system having a flow rate distributor for the flow rate equalization, especially directed to closed cyclone systems of fluid catalytic cracking units (FCC). More specifically, the present invention relates to a distributor placed in the interconnecting section of the cyclones of the disengager (separator) vessel of the gas-solid suspension in fluid catalytic cracking processes, which distributes the gases from the cyclones of the reaction zone and the disengager vessel, so as to promote a desirable by and uniform flow rate of said gases throughout said area. The distributor further absorbs the relative movements among the cyclones caused by the differential thermal expansion.

BACKGROUND INFORMATION

The fluid cracking catalytic process (FCC) is the backbone of many refineries, since most of the products are highly valuable.

Therefore, for the convenient working of a refinery, it is highly desirable that the FCC units operate without interruption during long periods of time and process various kinds of feeds, including heavy feeds having boiling points above 570° C.

Broadly, the fluid cracking catalytic process (FCC) aims at converting high boiling point hydrocarbons into light hydrocarbon fractions such as gasoline and liquid petroleum gas (LPG). Most of the gasoline included in the gasoline pool of a refinery originates generally from the FCC unit.

As a catalytic process, FCC uses catalysts that are responsible for the optimized yields in valuable products of high commercial value, such as gasoline, diesel oil and LPG, while the yields in less desirable products such as coke and fuel gas are minimized.

The friction strength features of such catalysts are as important as their chemical features. The reason of the concern with the friction strength of the FCC catalysts is easily understood in view of the high cost of the catalyst as well as of the increasing requirements in terms of the control of the particulate emissions by the refineries.

In spite of all the concern as well as the high technology involved, even so the FCC catalyst undergoes abrasion due to the high circulation velocities of the catalyst in the units. The abrasion of the FCC catalyst results in the reduction of the catalyst particle size—initially microspheres having a diameter around 70 micra, towards smaller size ranges, below 20 micra.

The state-of-the-art system usually employed for the separation (disengagement) of the catalyst from the gaseous products of the FCC unit is that of cyclone disengagers, or simply cyclones.

The separation of gas-solids mixtures using cyclones is one of the oldest industrial systems and is based on the common principle of the use of centrifuge force to separate solid particles from gases. In spite of the apparent simplicity, much is still studied and discussed in the search of a better cyclone performance.

Being at first apparatuses used aiming solely to separate and recover the catalyst from the products of the unit, with time and due to the various feeds and process modifications, the FCC cyclones acquired a new perspective, intervening even in the conversion results of the unit In order to better evaluate the above statement, it is necessary to understand the basics of the FCC process.

In the fluid catalytic cracking unit the pre-heated catalyst is thoroughly admixed to the atomized feed stock of the unit and the so-formed mixture is conveyed to the reaction zone of the unit where occur the cracking reactions. The reaction zone is generally an elongated vertical tube, which may have the mixture flow in the upward direction (riser), or downward (downer).

The cracking products, hydrocarbon gases and vapors form a gas-solid suspension with the catalyst. Such suspension should be quickly and efficiently separated on exiting the reaction zone in order to minimize the overcracking reactions, which lead to the formation of less desirable products (fuel gas and coke). Such separation is achieved through the use of cyclones placed within the disengager vessel.

In order to improve the separation of the solid catalyst particles sets of cyclones (first and second stages) are installed.

The first cyclone stage carries most of the separation job and usually recovers around 99% of the total solids fed. The first cyclone stage has the easiest job since the catalyst particles have an average particle size between 60 and 70 micra, there is a huge amount of available gas to provide the centrifugal forces and there are no problems for discharging significant amounts of gas through the cyclone leg.

The second cyclone stage receives approximately the same amount of gas as the first cyclone stage, but the solids content is several orders of magnitude less. Due to such adverse conditions as well as to the fact that the particles that reach the second stage are of a smaller average size, the typical-recovery of a second stage cyclone is of from 95 to 98% of the total solids fed.

Once the catalyst has been separated from the gases and cracking reaction products, the stripping is started, whereby the hydrocarbons adsorbed on the catalyst or entrained by the flow are removed by entrainment with stripping steam.

After the stripping section the catalyst is conveyed to the regenerator, where the combustion reactions for the removal of the coke deposited on the catalyst occur. In the interior of the regenerator, the flow rates of combustion gases may also be considerable so in order to avoid loss of catalyst entrained by the gas produced in the burning reactions, cyclones are also installed for the separation of the gas-solid mixture.

Normally in the regenerators are also installed sets of cyclones of different and consecutive stages, as in the case of the disengager vessel.

Catalyst make-up also occurs in the regenerator through the addition of amounts of virgin catalyst calculated to keep the catalyst inventory as well as the FCC unit conversion.

In the disengager as well as in the regenerator, the adequate working of the cyclones is paramount to secure a suitable performance of the unit, with at the same time minimum catalyst loss and thus minimum particulate emission.

With passing of time as well as in view of the modifications introduced in the FCC units as a function mainly of the composition of the feed stocks, it was found that there was a requirement of an ever smaller residence time for the feed and of the reaction products with the catalyst in order to minimize the overcracking reactions.

Various methods and procedures have been proposed aiming at reaching these objectives.

One of the well-known and utilized modes aiming at this objective is the so-called "closed cyclones", which is based on the concept of the reaction zone directly connected to the cyclone disengager.

According to the concept of "closed cyclones", the cyclones installed in is the interior of the disengager vessel are directly linked to the reaction zone of the unit; a second cyclone stage is linked to the cyclones of the reaction zone, in series, by means of a linking pipe made up of cylinders of different diameters and mounted in telescopic form to absorb the movements due to differential thermal expansions between these cyclone stages.

This concept allows to minimize the presence of particulate matter in the exiting gases from the disengager vessel and the reaction products are more rapidly separated from the catalyst so that the overcracking reactions are significantly reduced by the reduction of the contact time between the catalyst and the cracking products.

U.S. Pat. No. 4,502,947 corresponding to Brazilian patent PI 8404451 teaches the efficient and quicker separation of the products obtained by the use of cyclone disengagers directly connected to the bottom of the riser, those being linked to cyclone sets of first and second stages. Concentric pipes, mounted in telescopic form to absorb movements due to the differential thermal expansions between the riser cyclones and these cyclone stages make the link between the exit of the riser cyclone and the inlet nozzle of the first stage of the cyclone pairs. Purge and stripping vapors flow through the annular space existing between the concentric pipes together with some entrained catalyst The use of different kinds of fillings in the interior of the annular section is suggested for mounting the concentric pipes, so as to keep some room for the circulation of the stripping steam.

U.S. Pat. No. 5,569,435 corresponding to Brazilian PI 9303773 of the Applicant and herein fully incorporated as reference, teaches that a diplegless cyclone disengager also known as pseudocyclone, directly coupled to the bottom of the riser and connected to a cyclone set by means of a pipe made up of concentric cylinders, mounted in telescopic form, allows a more efficient separation of the gas-solid suspension in the disengager vessel of the FCC unit. The annular space between the concentric cylinders is dimensioned to absorb the gases from the stripping section and the purge steam of the disengager vessel, without the need of some kind of filling for the annular section.

Thus, the use of closed cyclone systems in FCC units makes possible to optimize the separation of the gas-solid suspension, thus minimizing the catalyst losses by entrainment, reducing the contact time between the catalyst and the cracking products, and avoiding the overcracking and the increase in less desirable products such as coke and gas, with obvious benefits for the refiner as well as for the environment.

However, for the efficient operation in a regime of closed cyclones in FCC units, the coupling between the cyclones of different and consecutive cyclones by using concentric pipes of different diameters mounted in telescopic form, still results in some unsolved operation difficulties.

For example, for FCC converters where the set of riser-cyclones or the set of downer-cyclones is of asymmetric construction there is the risk of non-uniform operation between the sets of cyclones due to the difference in charge loss.

Under such condition, the need to accommodate the differential thermal expansion between the cyclones of the reaction zone and the stage connected to it in the radial direction of the disengager vessel may imply in the adoption of an annular space of specific area higher than desirable to accommodate the flow rates required in the dimensioning. In this case, higher injection of purge steam in the disengager vessel would be mandatory in order to avoid catalyst entrainment from the cyclones of the reaction zone, reducing the separation efficiency and affecting the quality of the products, with important losses for the refiner as well as for the environment.

The larger demand for purge steam to the FCC unit may bring to the refiner a series of restrictions, the operation being already carried out with the steam boilers working at the upper capacity limit.

A further complex situation occurs in an unit operating with various asymmetric cyclone sets at the disengager vessel, when the asymmetry of the sets causes a differentiated flow rate among them, this unavoidably resulting in a non-optimized operation of the cyclone sets.

Thus, in spite of the trials and proposals of the specialized literature, there is not yet a solution to the flow rate equalization in closed cyclone systems that would reduce the required flow rate of the purge steam having origin in the disengager vessel, towards the interior of the cyclone connecting pipe and which would allow the uniform operation of the cyclones in FCC converters having an asymmetric construction of the riser-cyclones set or of the downer-cyclones set such as the novel solution described and claimed in the present invention.

SUMMARY OF THE INVENTION

Broadly, the present invention comprises a closed cyclone system having a distributor for the equalization of the flow rate of the cyclones of different and consecutive stages, the distributor uniformly dispensing the gases from the majority or from all the first stage cyclones.

The present invention provides the installation in the section known as the connecting pipes section having telescopic joints, of a distributor which uniformly distributes, the gases from the first stage cyclones without structural harm for the accommodation of the differential thermal expansions.

The present invention provides thus a distributor for the homogenization of the flow rates from each first stage cyclone, making the operation of the second stage cyclones uniform and minimizing the use of extra purge steam by reducing the number of telescopic joints and of the total annular specific area in the region of the cyclone connecting pipe, keeping the same annular gap and thus reducing the required flow rate for the purge steam from the disengager vessel.

The present invention provides further a distributor for the equalization of the cyclone flow rate in closed cyclone systems which allows for a homogeneous accommodation of the gas-solid mixture in the pipe, allowing a uniform operation of the cyclones in the next stage.

The present invention provides further a closed cyclone system having a distributor for the flow rate equalizations causing that the disengager vessel contains a lower amount of material in its interior as well as easier maintenance of the cyclone system.

DETAILED DESCRIPTION OF THE PREFERRED EMBODIMENTS

The present invention will now be described in combination with the appended figures.

Figure 1:
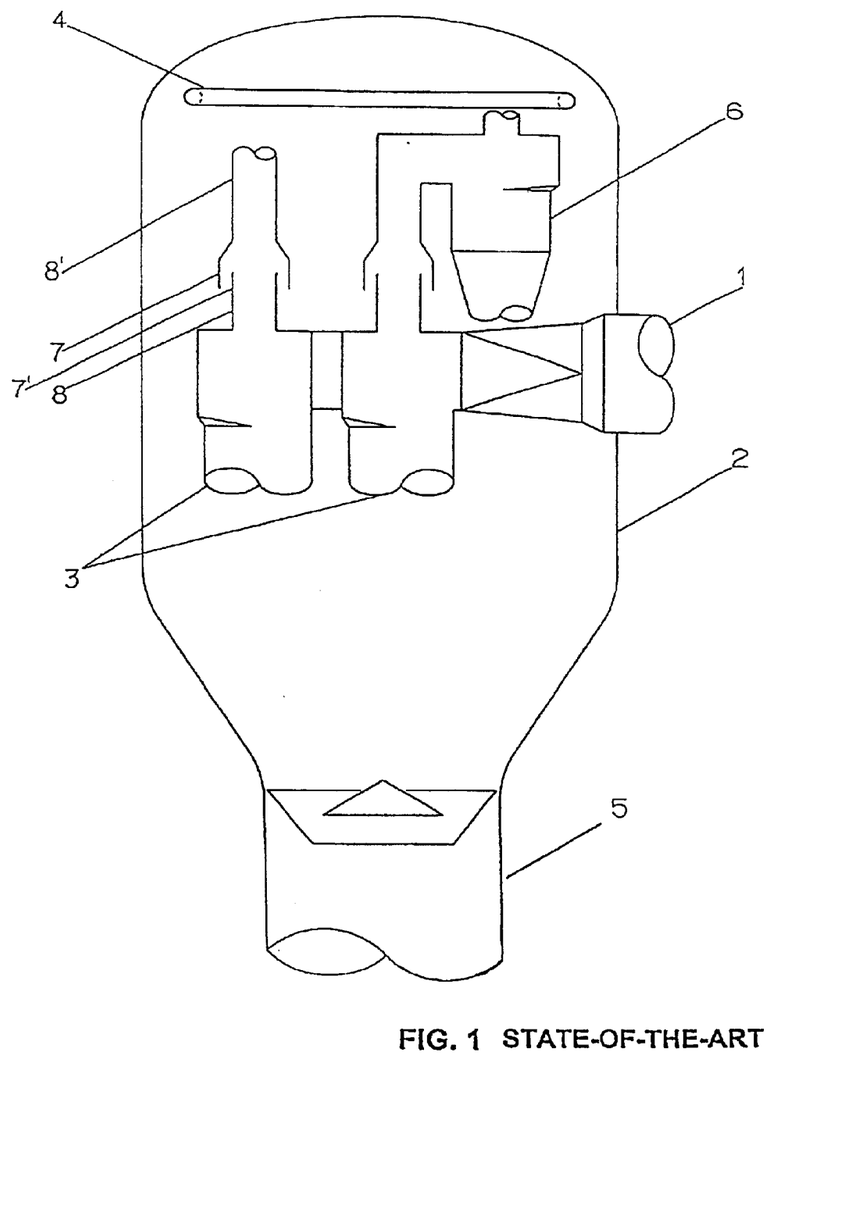
FIG. 1 attached is a cut of the separation section of an FCC unit, according to the state-of-the-art technique.

FIG. 1 shows a set of closed cyclones installed in a disengager vessel of an FCC unit according to the state-of-the-art technique. In this configuration, the lower end of the reaction zone (1) discharges the gas-solid suspension formed by the catalyst and cracking reaction products into the disengager vessel (2) through the first stage cyclones (3) where occurs the separation of most of the suspended catalyst. Purge steam is introduced through steam distributor (4).

Catalyst particles separated from the first stage cyclone and already substantially free of hydrocarbon vapors are conveyed to the stripping section (5) where the withdrawal of the hydrocarbons adsorbed on the catalyst surface occurs and lately to the regenerator, not indicated in the figure.

Cracking products separated from the first stage cyclones (3), still entraining catalyst particles, reach the second stage cyclones (6), where said products are nearly completely separated; the gaseous phase is then conveyed to the cracked products fractionating systems while the solid phase is directed to the bottom of the disengager vessel (2) and then to the stripper (5). The operation conditions of the second stage cyclones are quite distinct from those of the first stage cyclones, mainly as a result of the change in composition of the gas-solid suspension, which is now much more rich in the gaseous phase.

Exits of first stage cyclones (3) are connected to the second stage cyclones (6) through the first stage outlet pipes (8), telescopic joints (7) and connecting pipes (8'). This is the region usually known as the "connecting pipes region".

According to this concept, to each set of cyclone stages corresponds one first stage outlet pipe (8), a telescopic joint (7) and a connecting pipe (8') and therefore an annular space (7') through which passes the purge steam for equalizing pressures and prevent the catalyst return. Ideally, the flow of gases through the lower orifice of the cyclone (3) cone of the reaction zone represents of from 0.1 to 7% of the total gas flow rate directed to the next cyclone stage, preferably 5% of the total gas flow rate.

It will become obvious to the experts that the size of the annular space (7') formed between the telescopic joint and the cyclone connecting pipe will vary as a function of the geometry of the set as well as of the gaps required for accommodating the differential thermal expansions. It is equally obvious that the amount of purge steam required to keep the pressure of the system is a function of the area formed by the annular space. Therefore, the larger said space, the more purge steam will be required. For certain refineries said purge steam demand might eventually turn into a problem and require extra expenditure for steam supply.

The following description of the Figures that illustrate preferred modes of the invention relates to the solutions offered for reducing the consumption of purge steam through the use of the inventive flow rate distributor.

Figure 2:
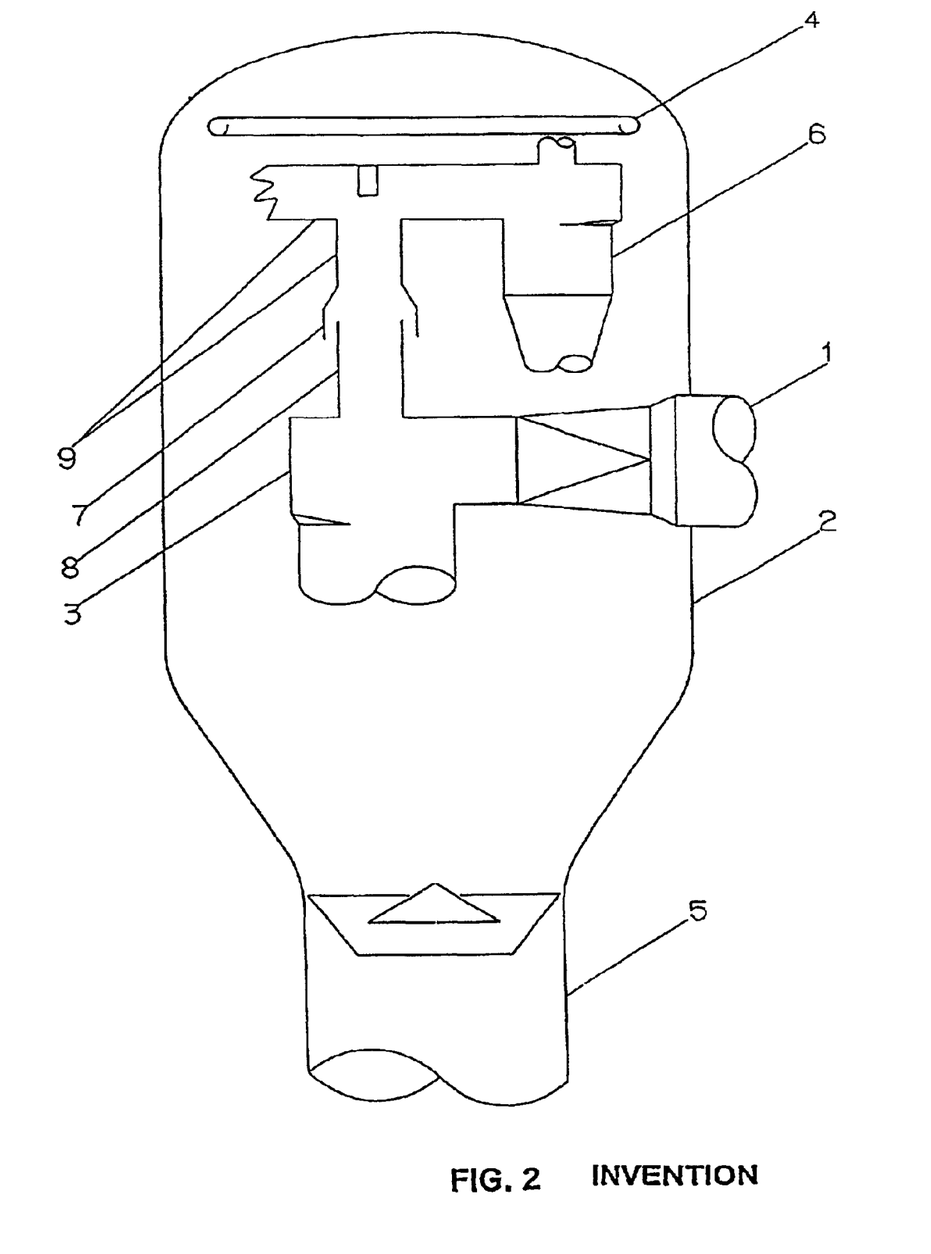
FIG. 2 illustrates one of the embodiments of the present invention, showing a cut of the separation section of an FCC unit having the distributor for the flow rate equalization as suggested by the invention.

FIG. 2 illustrates one of the preferred modes of the present invention with the disengager vessel of an FCC unit having installed in said vessel the closed cyclone system and flow rate distributor.

According to this preferred mode, one single first stage cyclone (3) or the reaction zone cyclone is connected by means of its outlet pipe (8) and of the telescopic joint (7) to the flow rate distributor (9) of the invention, which uniformly distributes the gases exiting the first stage cyclone (3) to all the second stage cyclones (6). Thus, there is no need that the number of first stage cyclones (3) and second stage cyclones (6) be the same, since the number of second stage cyclones (6) may vary according to the cyclone design.

The number of telescopic joints (7) is substantially reduced as well as is the total surface of the annular space of the telescopic joints, while keeping the same annular gaps; as a consequence, the required flow of purge steam exiting the disengager vessel (2) is reduced. By installing the closed cyclone system having a flow rate distributor (9) of the present invention the homogeneous accommodation of the gas-solid mixture is secured, allowing a uniform operation of the second stage cyclones (6).

Figure 3:
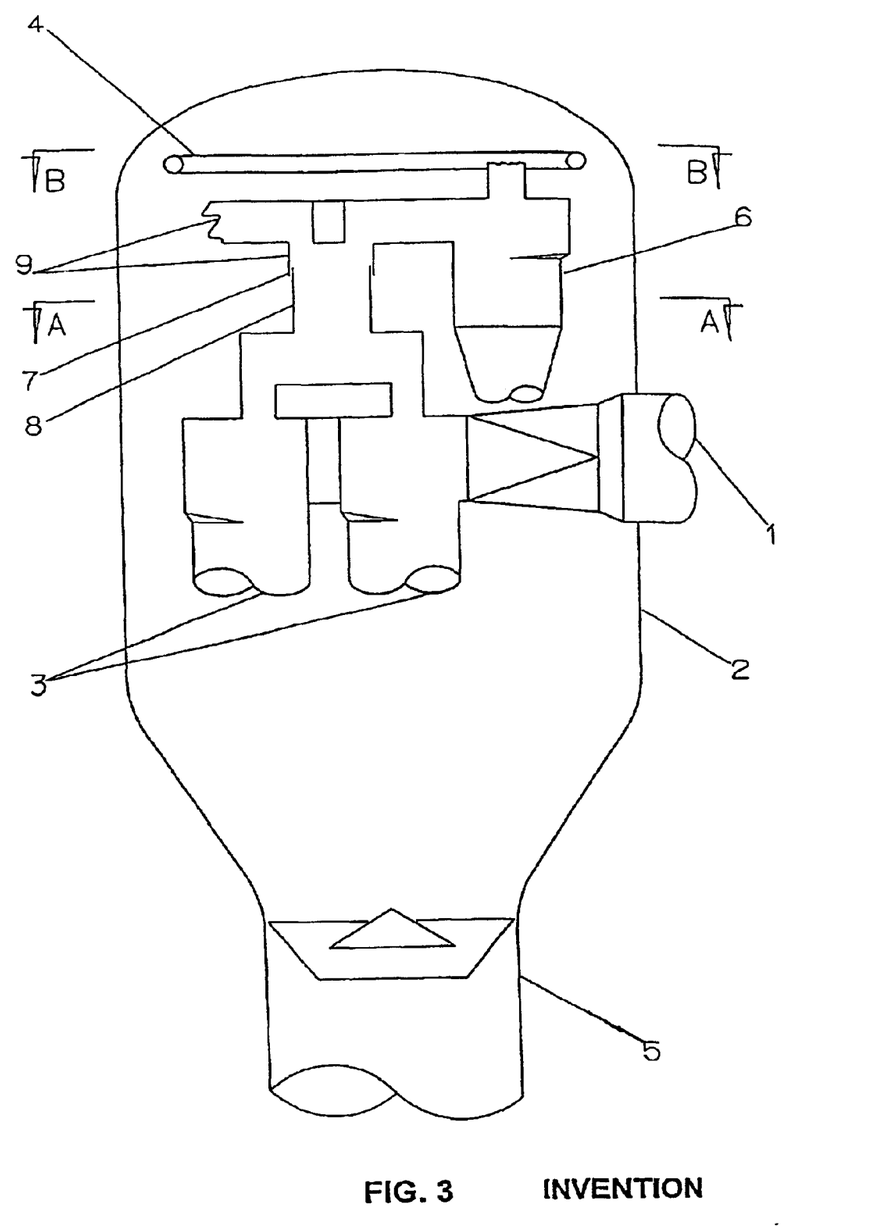
FIG. 3 illustrates another mode of the invention, when more than one first stage cyclone is connected to one single distributor of flow rate equalization.

FIG. 3 shows a further embodiment of the present invention where two pairs of first stage cyclones (3) are connected to the flow rate distributor (9) through the outlet pipe (8) and the telescopic joint (7). Although this FIGURE and the A—A cut of FIG. 4 indicate two first stage cyclones only, this number may vary according to the cyclone design, and therefore this aspect does not constitute a limitation of the invention.

According to this embodiment, the flow rate distributor (9) aims at concentrating and dispensing the gas-solid suspension exiting the first stage cyclones (3) towards the second stage cyclones (6) so as to significantly reduce the purge steam requirement; this is simply a consequence of the reduction in the number of telescopic joints (7) and thus the area of the annular spaces formed by the connection of the telescopic joints (7) and flow rate distributor (9).

Figure 4:
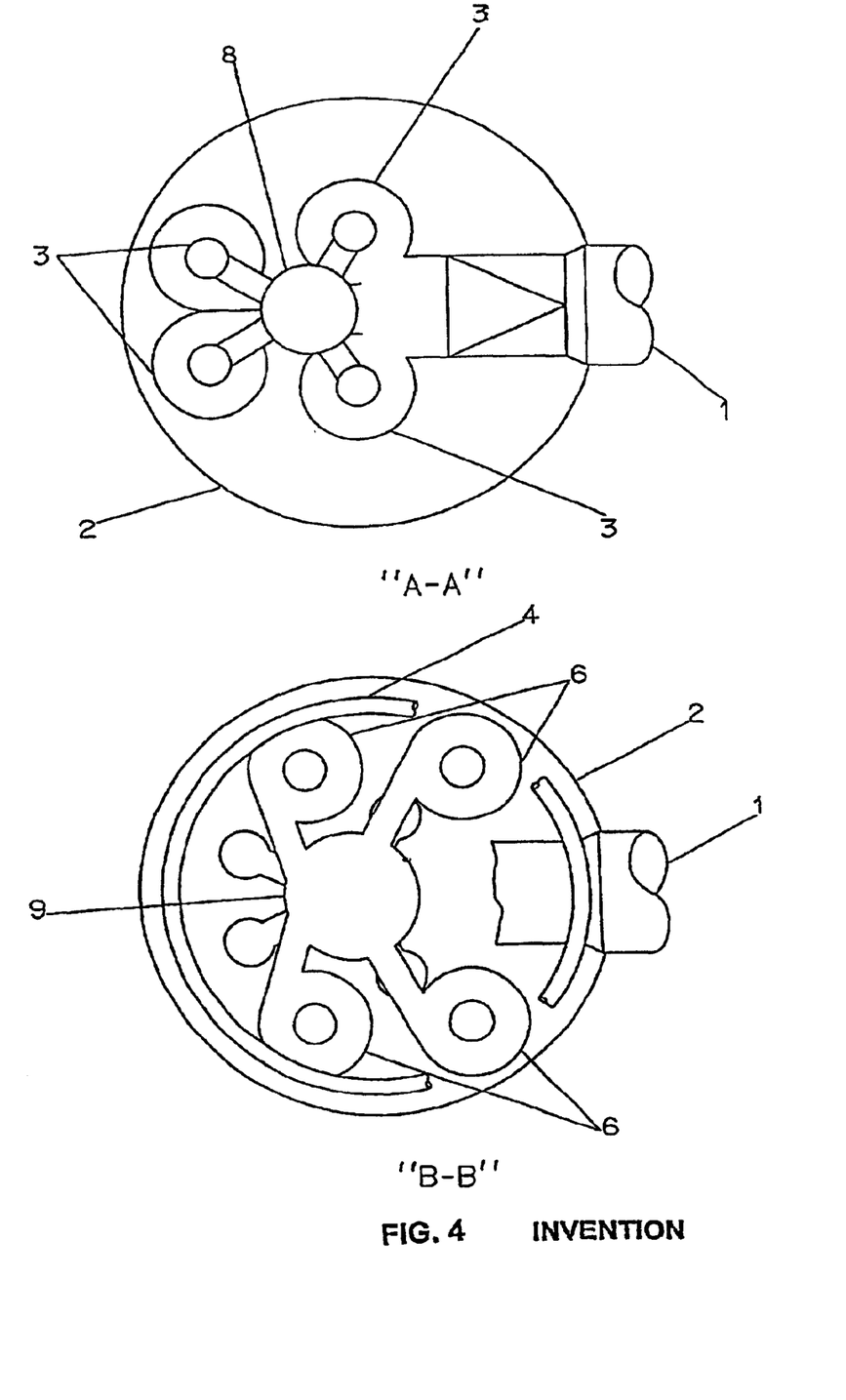
FIG. 4 illustrates with the aid of two cross section cuts the preferred mode of the invention shown in FIG. 3. The A—A cut shows the first stage cyclones directly connected to the section of the connecting pipes having telescopic joints. The B—B cut shows the connection between the distributor of the invention and the cyclones of the next or of the second stage.

FIG. 4 shows cross section cuts A—A and B—B indicating respectively in A—A the connection of the outlet pipe (8) with the first stage cyclones (3) and in B—B the connection of flow rate distributor (9) with second stage cyclones (6).

This embodiment constitutes a strong evidence of the advantage of the use of the closed cyclone system having a flow rate distributor (9) according to the invention, since no matter the number of first stage cyclones (3) and second stage cyclones (6), the operation of these latter is rendered homogeneous in view of the homogenization of pressure caused by the flow rate distributor (9).

Figure 5:
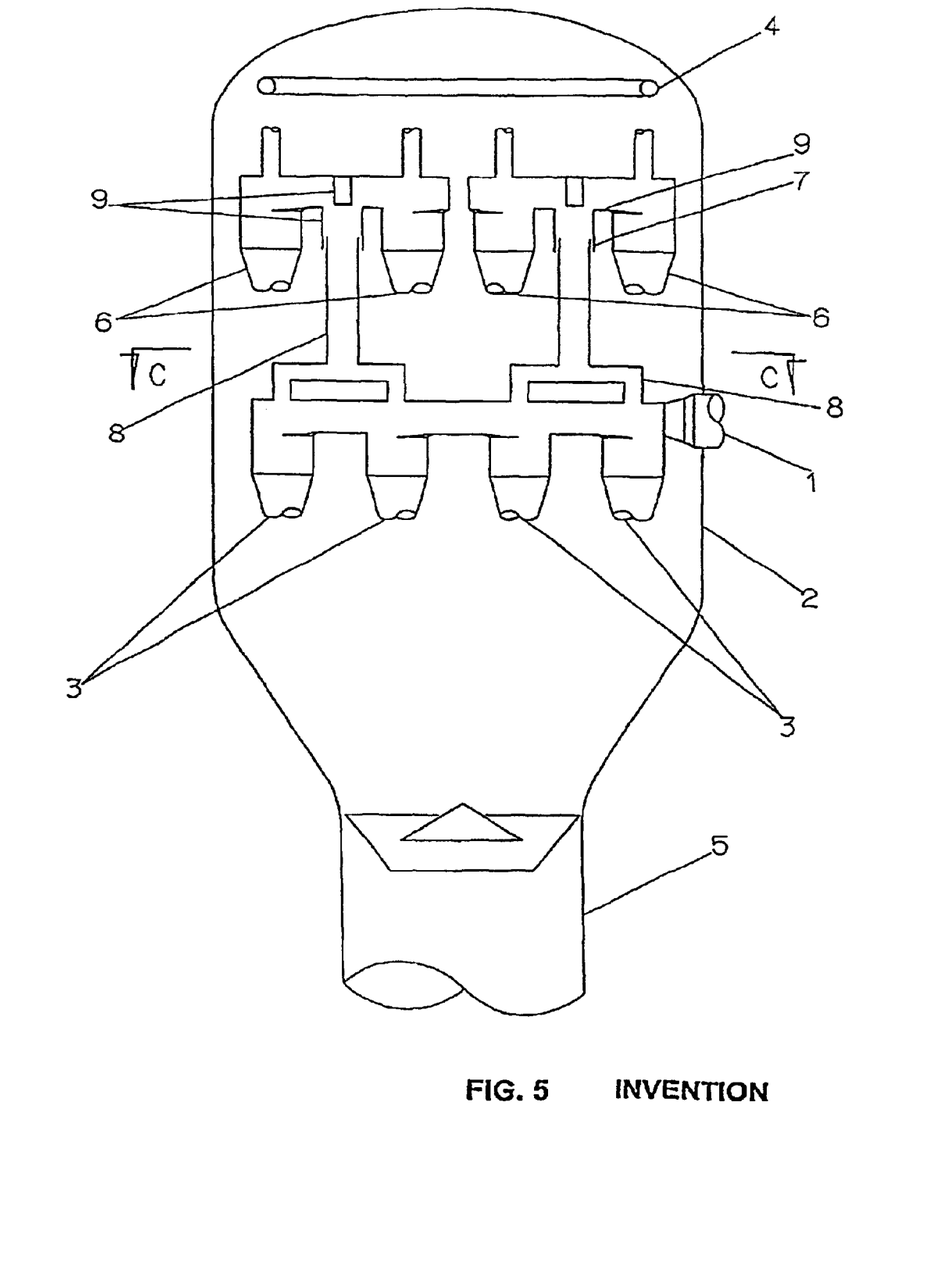
FIG. 5 shows still another preferred mode of the invention where two distributors are installed to allow the flow rate equalization of the closed cyclones when in a non-symmetrical space arrangement.

FIG. 5 illustrates still another preferred mode of the invention whereby more than one flow rate distributor (9) is installed whenever the asymmetry of the set of primary cyclones is such that one single flow rate distributor (9) in the interior of the disengager vessel (2) or of the stripper is not spatially favored. For the sake of illustration only, FIG. 5 depicts two flow rate distributors (9 and 9'); a larger number is possible depending on the cyclone design, and this is not a limiting aspect of the invention.

Figure 6:
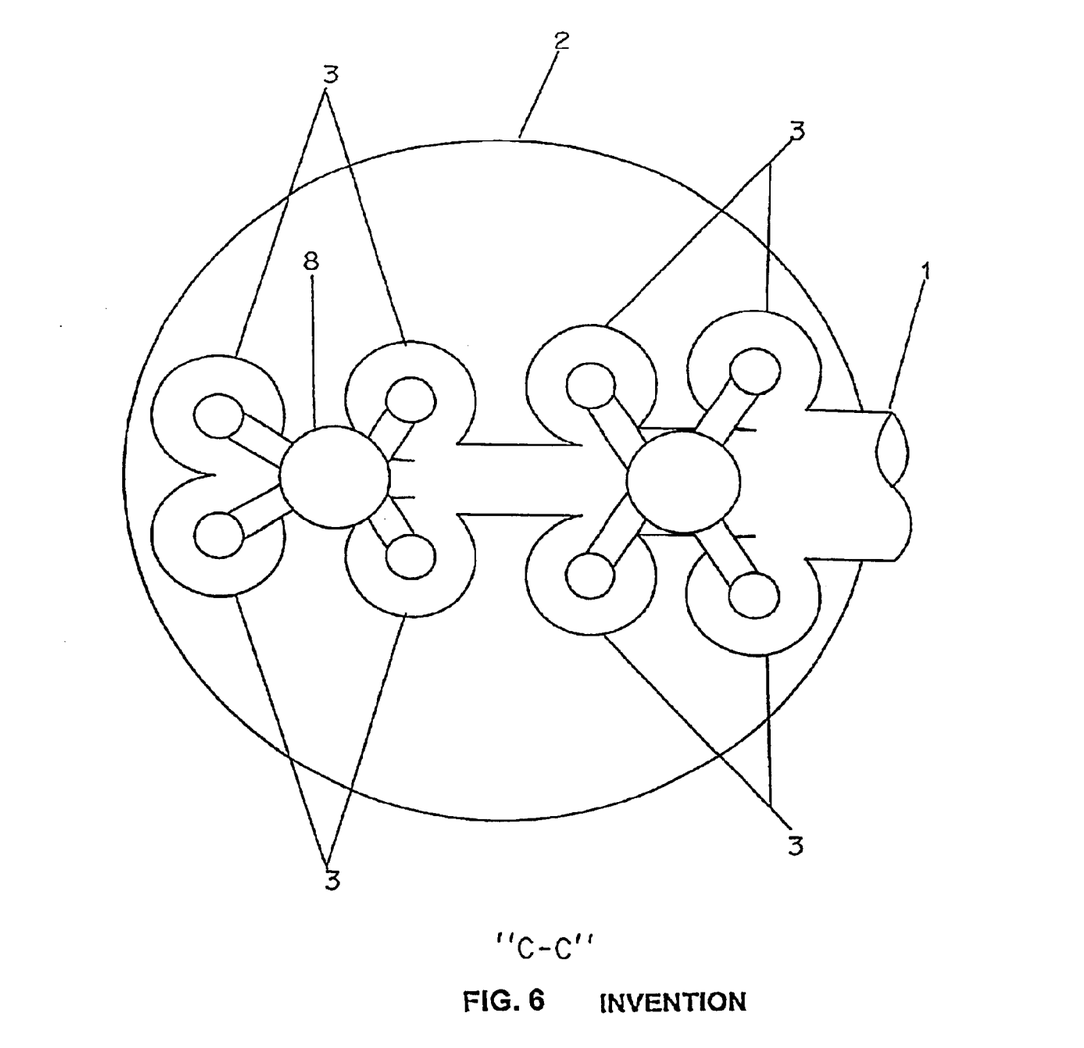
FIG. 6 shows the cross-section C—C cut of the preferred mode of the invention shown in FIG. 5.

FIG. 6 illustrates the cross section cut C—C showing the connections of first stage cyclones (3) with the outlet pipes (8); it can be seen how the use of more than one flow rate distributor (9) according to the invention leads to a better arrangement of the first stage cyclones (3), by concentrating and uniformly distributing the gas-solid suspension towards the second stage cyclones (6), which may then operate in a homogeneous way, since the pressure among them is equalized with the aid of distributors (9 and 9').

It should be borne in mind that the appended FIGURES are merely illustrative of the invention and do not intend to exhaust all the possibilities that may be exploited by the use of the closed cyclone system having the suggested distributor (9), other combinations and arrangements of distributors and cyclones of different and consecutive stages being possible as a function of a project designed for each disengager or regenerator vessel of the FCC unit, this not constituting a limiting aspect of the invention.

As regards the material used to manufacture the distributors (9) of the invention, it is preferred to use the same material as that used in the manufacture of first and second stage cyclones; other materials may be used provided their thermal expansion coefficient is compatible with that of the cyclone manufacture, this not representing a limitation of the present invention.

By using the closed cyclone system having a distributor (9) of the invention the contents in the interior of the disengager vessel (2) are reduced as a consequence of the reduction in the number of telescopic joints (7), besides easier maintenance and cleaning of the system.

It is also clear that the use of the closed cyclone system having a distributor (9) is not limited to the diesengager vessel (2) of the FCC unit, and may be installed as well in the regenerator, not indicated in the figure, that also operates with cyclone sets of different and consecutive stages.

It is obvious to the experts that the closed cyclone system having a distributor (9) as described and claimed by the present invention may be installed in any units that operate under similar conditions and therefore its use is not limited to the closed cyclone systems in fluid catalytic cracking units (FCC).

I claim:

1. A closed cyclone system having a distributor (9), wherein the interconnection between the cyclones of different and consecutive stages comprises the connecting pipe (8), the telescopic joint (7) and the distributor (9) that uniformly distributes the gases from the majority of the first stage cyclones (3) towards the second stage cyclones (6).

2. A system according to claim 1, wherein the distributor (9) uniformly distributes the gases from all the first stage cyclones (3) towards the second stage cyclones (6).

3. A system according to claim 1, wherein the first stage cyclones (3) are directly connected to the reaction zone (1).

4. A system according to claim 1, wherein the distributor (9) is connected to one single first stage cyclone (3) no matter the number of second stage cyclones (6).

5. A system according to claim 1, wherein the distributor (9) is connected to more than one first stage cyclone (3) no matter the number of second stage cyclones (6).

6. A system according to claim 1, wherein the number of distributors (9) connected to the first stage cyclones (3) may be higher than one, no matter the number of second stage cyclones (6).

7. A system according to claim 1, 2, 3, 4, 5 or 6, wherein said system is mounted within a disengager vessel (2) of a fluid catalytic cracking unit (FCC).

8. A system according to claim 1, 2, 3, 4, 5 or 6, wherein said system is mounted with a regenerator vessel (2) of a fluid catalytic cracking unit (FCC).

9. A system according to claim 1, 2, 3, 4, 5, or 6, wherein the reaction zone (1) of the fluid catalytic cracking unit (FCC) is of upward flow (riser).

10. A system according to claim 1, 2, 3, 4, 5, or 6, wherein the reaction zone (1) of the fluid catalytic cracking unit (FCC) is of downward flow (downer).

11. A system according to claim 1, 2, 3, 4, 5, or 6, wherein the distributor (9) is manufactured from the same material as that employed to make the cyclones.

12. A system according to claim 1, 2, 3, 4, 5, or 6, wherein the distributor (9) is manufactured from a different material from that employed to make the cyclones.

13. A system according to claim 1, 2, 3, 4, 5, or 6, wherein said system is designed for use in fluid catalytic cracking units (FCC).

14. A system according to claim 13, wherein the flow rate of fluids conveyed through the annular space of the telescopic joint (7) represents of from 0.1 to 7% by weight of the total flow rate of gases, more preferably 5 weight % of the total flow rate of gases.

15. Use of closed cyclone systems according to claim 1, having distributors (9) for equalization of flow rate.

* * * * *